(12) United States Patent
Berube et al.

(10) Patent No.: US 12,244,975 B2
(45) Date of Patent: Mar. 4, 2025

(54) METHOD AND SYSTEM FOR BALANCING THE LOAD OF AN IMAGE GENERATOR

(71) Applicant: CAE INC., Saint-Laurent (CA)

(72) Inventors: Samuel Berube, Saint-Laurent (CA); Jean-Sebastien Dion, Saint-Laurent (CA)

(73) Assignee: CAE INC., Saint-Laurent (CA)

( * ) Notice: Subject to any disclaimer, the term of this patent is extended or adjusted under 35 U.S.C. 154(b) by 495 days.

(21) Appl. No.: 17/661,053

(22) Filed: Apr. 28, 2022

(65) Prior Publication Data
US 2022/0353479 A1 Nov. 3, 2022

(30) Foreign Application Priority Data
Apr. 30, 2021 (CA) ................. CA 3116761

(51) Int. Cl.
| | | |
|---|---|---|
| H04N 9/31 | (2006.01) | |
| G03B 21/20 | (2006.01) | |
| G03B 21/26 | (2006.01) | |
| G06F 3/01 | (2006.01) | |

(52) U.S. Cl.
CPC ....... *H04N 9/3147* (2013.01); *G03B 21/2013* (2013.01); *G03B 21/26* (2013.01); *G06F 3/012* (2013.01); *G06F 3/013* (2013.01); *H04N 9/3188* (2013.01)

(58) Field of Classification Search
CPC .. H04N 9/3147; H04N 9/3188; H04N 9/3182; G03B 21/2013; G03B 21/26; G06F 3/012; G06F 3/013; G06F 3/1446; G09B 5/10; G09B 5/12; G09G 2300/026; G09G 2340/0407; G09G 3/002
See application file for complete search history.

(56) References Cited

U.S. PATENT DOCUMENTS

| | | | |
|---|---|---|---|
| 9,588,408 B1 * | 3/2017 | Linnell | H04N 9/3185 |
| 10,063,818 B1 * | 8/2018 | Linnell | H04N 9/3155 |
| 2003/0122733 A1 | 7/2003 | Blackham et al. | |

(Continued)

OTHER PUBLICATIONS

Blanke W. et al. "Active Visualization in a Multidisplay Immersive Environment", Eurographics Workshop on Virtual Environments. Barcelona, Spain, May 30, 2002, pp. 103-111, ISBN: 978-1-58113-535-0.

*Primary Examiner* — Magda Cruz
(74) *Attorney, Agent, or Firm* — Fasken Martineau DuMoulin LLP; Johann Gest

(57) ABSTRACT

A display system defining an expected position for a user with respect to a screen having first and second segments positioned so as to never simultaneously fall at least partially within a targeted field of view when the user is at the expected position, the system comprising: an image generator paired with a first projector covering the first segment and a second projector covering the second segment, the image generator being configured to generate a first image to be projected on the first segment and a second image to be projected on the second segment; a first module for determining that the first segment falls at least partially within the targeted field of view; and a second module for controlling hardware resources of the image generator to prioritize the generation of the first image when the first segment falls at least partially within the targeted field of view.

20 Claims, 6 Drawing Sheets

(56) References Cited

U.S. PATENT DOCUMENTS

2006/0152680 A1* 7/2006 Shibano ................ G03B 37/04
  345/1.3
2011/0309999 A1* 12/2011 Chang ................ H04N 13/363
  345/1.1

* cited by examiner

METHOD AND SYSTEM FOR BALANCING THE LOAD OF AN IMAGE GENERATOR

TECHNICAL FIELD

The present invention relates to the field of methods and systems for displaying images, and more particularly to methods and systems for displaying different images on different segments of a screen.

BACKGROUND

A simulator usually requires the generation and display of high-quality images to render a simulation realistic. In order to provide the high quality for the generated images, a simulator usually comprises a large number of image generators since an image generator is provided with limited computing resources such as a limited processing power. As a result, each image generator is responsible for generating a single image to be displayed on a respective screen or a respective segment of a screen. While the images generated by a given image generator are dynamic, i.e., the content of the images varies in time, the image generated by the given image generator are always displayed on the same screen or the same segment of a screen, i.e., a single screen or a single segment of a screen is assigned to each image generator and the image generator only generates an image to be displayed on its assigned screen or its assigned segment of a screen. While such a simulator comprising a large number of image generators can generate and display high quality images, the required computing resource is important, thereby rendering such a simulator expensive.

Therefore, there is a need for an improved method and system for displaying images.

SUMMARY

According to a first broad aspect, there is provided a display system defining an expected position for a user with respect to a screen, the screen having a first segment and a second segment positioned with respect to one another so as to never simultaneously fall at least partially within a targeted field of view of the user when the user is positioned at the expected position, the display system comprising: an image generator paired with a first projector covering the first segment and a second projector covering the second segment, the image generator being configured to generate a first image to be projected by the first projector on the first segment and a second image to be projected by the second projector on the second segment; a field of view module for determining that the first segment falls at least partially within the targeted field of view of the user; and a load balancing module for dynamically controlling hardware resources of the image generator to prioritize the generation of the first image over the generation of the second image when the first segment falls at least partially within the targeted field of view of the user.

In one embodiment, the targeted field of view comprises a given portion of a whole field of view of the user.

In one embodiment, the display system further comprises a tracking unit for determining at least one of a position of a head of the user, an orientation of the head of the user, a position of at least one eye of the user and a line of sight of the user.

In one embodiment, the field of view module is configured to determine that the first segment falls at least partially within the targeted field of view of the user based on the at least one of the position of the head of the user, the orientation of the head of the user, the position of the at least one eye of the user and the line of sight of the user.

In one embodiment, the load balancing module is configured for determining a first resolution for the first image and a second resolution for the second image and the image generator is configured to generate the first image provided with the first resolution and the second image with the second resolution, the first resolution being greater than the second resolution as a result of the prioritization of the first image by the load balancing module.

In one embodiment, the image generator is configured to generate the second image as a black image so that the second projector projects no image as a result of the prioritization of the first image by the load balancing module.

In one embodiment, the image generator is configured to generate the second image as a white image as a result of the prioritization of the first image by the load balancing module.

In one embodiment, the image generator is configured to determine a given intensity for the white image to maintain a given luminosity around the user.

In one embodiment, the image generator is configured to generate the second image as a blurred image.

In one embodiment, the load balancing module is configured for determining a first value of a parameter for the first image and a second value of the parameter for the second image and the image generator is configured for generating the first image according to the first value of the parameter and the second image according to the second value of the parameter, the parameter comprising one of: an image quality, an undersampling, an anti-aliasing, a texture quality, a texture filtering quality, a mesh detail, a content density and a rendering resolution.

In one embodiment, the display system further comprises the first projector and the second projector.

According to a second broad aspect, there is provided a method for controlling an image generator to display images on a screen to a user when the user is positioned at an expected position with respect to the screen, the screen having a first segment and a second segment positioned with respect to one another so as to never simultaneously fall at least partially within a targeted field of view of the user when the user is positioned at the expected position, the image generator being paired with a first projector covering the first segment and a second projector covering the second segment, the image generator being configured to generate a first image to be projected by the first projector on the first segment and a second image to be projected by the second projector on the second segment, the method comprising: when the first segment falls at least partially within the targeted field of view of the user, dynamically controlling the hardware resources of the image generator to prioritize the generation of the first image over the generation of the second image when the first segment falls at least partially within the targeted field of view of the user.

In one embodiment, the targeted field of view comprises a given portion of a whole field of view of the user.

In one embodiment, the method further comprises the step of pairing the image generator with the first segment and the second segment.

In one embodiment, the method further comprises the step of determining that the first segment falls at least partially within the targeted field of view of the user.

In one embodiment, the method further comprises the step of determining at least one of a position of a head of the user, an orientation of the head of the user, a position of at least one eye of the user and a line of sight of the user, said determining that the first segment falls at least partially within the targeted field of view of the user being performed based on the at least one of the position of the head of the user, the orientation of the head of the user, the position of the at least one eye of the user and the line of sight of the user.

In one embodiment, the first image is provided with a first resolution and the second image with a second resolution, the first resolution being greater than the second resolution as a result of the prioritization of the first image.

In one embodiment, the second image is a black image so that no image is projected on the second segment as a result of the prioritization of the first image.

In one embodiment, the second image is a white image as a result of the prioritization of the first image.

In one embodiment, the method further comprises the step of determining a given intensity for the white image to maintain a given luminosity around the user.

In one embodiment, the second image is a blurred image.

In one embodiment, the step of dynamically controlling the hardware resources comprises determining a first value of a parameter for the first image and a second value of the parameter for the second image and the image generator is configured for generating the first image according to the first value of the parameter and the second image according to the second value of the parameter, the parameter comprising one of: an image quality, an undersampling, an anti-aliasing, a texture quality, a texture filtering quality, a mesh detail, a content density and a rendering resolution.

In one embodiment, the method further comprises the step of the image generator generating the first image and the second image.

In one embodiment, the method further comprises the first projector projecting the first image on the first segment and the second projector projecting the second image on the second segment.

According to a further broad aspect, there is provided a non-transitory computer program product for controlling an image generator to display images on a screen to a user when the user is positioned at an expected position with respect to the screen, the screen having a first segment and a second segment positioned with respect to one another so as to never simultaneously fall at least partially within a targeted field of view of the user when the user is positioned at the expected position, the image generator being paired with a first projector covering the first segment and a second projector covering the second segment, the image generator being configured to generate a first image to be projected by the first projector on the first segment and a second image to be projected by the second projector on the second segment, the non-transitory computer program product comprising a computer readable memory storing computer-executable instructions thereon that when executed by a computer, cause the computer to perform the steps of: when the first segment falls at least partially within the targeted field of view of the user, dynamically controlling the hardware resources of the image generator to prioritize the generation of the first image over the generation of the second image when the first segment falls at least partially within the targeted field of view of the user.

According to still another broad aspect, there is provided a system for controlling an image generator to display images on a screen to a user when the user is positioned at an expected position with respect to the screen, the screen having a first segment and a second segment positioned with respect to one another so as to never simultaneously fall at least partially within a targeted field of view of the user when the user is positioned at the expected position, the image generator being paired with a first projector covering the first segment and a second projector covering the second segment, the image generator being configured to generate a first image to be projected by the first projector on the first segment and a second image to be projected by the second projector on the second segment, the system comprising: a non-transitory computer program product comprising a computer readable memory storing computer-executable instructions; at least one processor for executing the computer-executable instructions to perform the steps of: when the first segment falls at least partially within the field of view of the user, dynamically controlling the hardware resources of the image generator to prioritize the generation of the first image over the generation of the second image when the first segment falls at least partially within the targeted field of view of the user.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
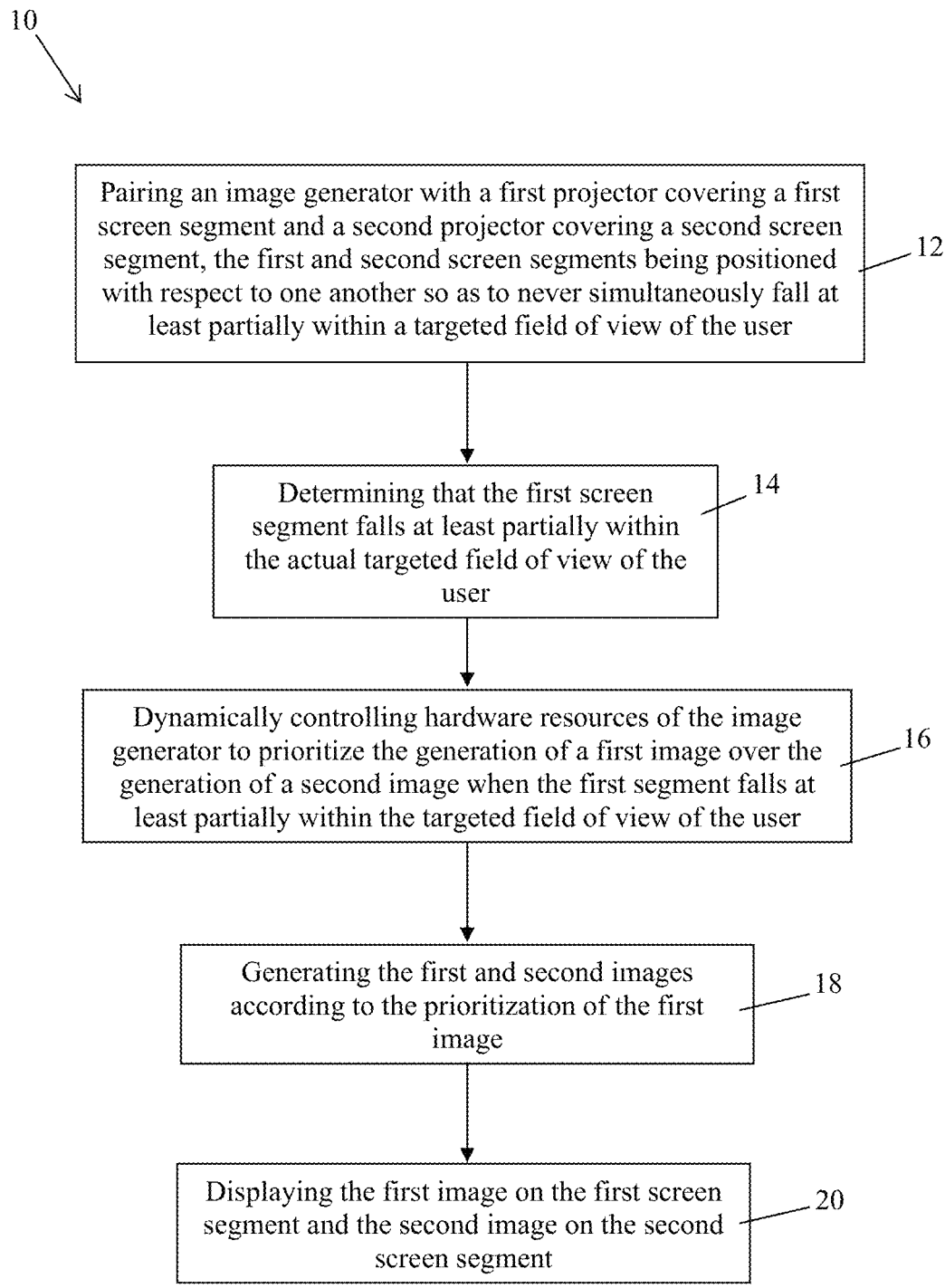
FIG. 1 is a flow chart illustrating a method for displaying images on different segments of a screen, in accordance with an embodiment.

As mentioned above, a simulator comprising a plurality of image processors, each assigned to or paired with a single respective screen or screen segment, may be expensive due to the important computing resource required for generating the images.

The inventors realized that in the context of at least some simulators, the display of high-resolution images may not always be required. For example, when a simulator which comprises a screen that surrounds at least partially the user of the simulator, the displayed images that are located outside of the field of view of the user or located within a peripheral portion of the field of view may not need to have a resolution as high as the resolution of the images that are displayed within the field of view of the user or within the central portion of the field of view since the images that are displayed outside of the field of view of the user are not seen by the user or the images that are displayed within the peripheral portion of the field of view are seen with low acuity. The inventors also realized that the pairing of at least two screens of the display unit or at least two screen segments with a same image generator could reduce the number of image generators required for generating all of the images if the relative positioning of the screens or screen segments is adequately chosen for the pairing, as described below. For example, pairing a same image generator with both a first screen segment and a second screen segment which are positioned relative to one another so that they can never be both concurrently at least partially within at least a portion of the field of view of the user allows the use of a single and same image generator for generating the images to be displayed on both the first and second screens, as described in greater detail below.

While in the following, an image generator is referred to as being assigned to or paired with at least two distinct segments of a screen, it should be understood that an image generator may be paired with a combination of screen(s) and/or segment(s) of screen(s). For example, if the size of the images generated by an image generator corresponds to the size of a screen, then the image generator may be paired with at least two distinct screens. If the size of the images generated by an image generator is smaller than the size of a screen, then the image generator may be paired with at least two segments of screens. In another example, an image generator may be paired with a first screen and a segment of a second screen. Therefore, in the following, referring to an image generator being paired with at least two segments of a screen should be interpreted as the image generator being paired with at least two screens, the image generator being paired with at least two segments of a same screen or distinct screens and/or the image generator being paired with at least one screen and at least one segment of a screen.

For example, the display unit may comprise a single screen surrounding at least partially the user, such as a 360-degree display unit or a dome display unit. In this case, at least one image generator may be paired with at least two distinct segments of the screen. It should be understood that the two distinct segments of the single screen are chosen so as to never be concurrently at least partially within at least a portion of the field of view of the user of the simulator when the user is located at an expected position relative to the screen.

In another example, the simulator may comprise four image generators and eight distinct screens which are disposed so as to surround the user of the simulator. The screens are paired two-by-two with a respective image generator to form four pairs of screens, each pair of screens being paired with a respective one of the four image generators. For each pair of screens, the two screens are positioned so that when one of the two screens is at least partially within the field of view of the user and the user is located at an expected position relative to the screens, the other screen is entirely outside of the field of view of the user.

FIG. 1 illustrates one embodiment of a method 10 for displaying images to a user on a screen when the user is located at an expected position relative to the screen. The screen comprises a plurality of screen segments and a respective image is to be displayed on each screen segment.

In one embodiment, projectors are used for projecting images on the screen segments. Each projector is paired with a respective screen segment to project images thereon.

It should be understood that when projectors are used for projecting images on screen segments, pairing given screen portions with a given image generator is equivalent to pairing the image generator with the given projectors that are used to project images on the given screen segments.

In another embodiment, display devices such as computer monitors, televisions, or the like are used for displaying images to the user. In this case, a screen segment may correspond to a display device or a section or portion of a display device.

Referring to FIG. 1, the first step 12 of the method 10 consists in pairing two segments of a screen, i.e., a first screen segment and a second screen segment, with a same image generator. The first and second screen segments to be paired with the image generator are chosen as function of their relative position and an expected position of the user relative to the screen segments such that the screen segments paired with the image generator can never fall concurrently at least partially within a targeted field of view of the user when the user is located at the expected position.

In one embodiment, the targeted field of view corresponds to the whole field of view of the user. In this case, the first and second screen segments are chosen so that they can never fall concurrently at least partially within any portion of the whole field of view of the user when the user is located at the expected position, i.e., when one of the first and second screen segments falls at least partially within the whole field of view of the user positioned at the expected position, the other screen segment is wholly outside of the whole field of view of the user.

In another embodiment, the targeted field of view corresponds to a given portion of the field of view of the user. In this case, the first and second screen segments are chosen so that they can never fall concurrently at least partially within the given portion of the field of view of the user when the user is located at the expected position, i.e., when one of the first and second screen segments falls at least partially within the given portion of the field of view of the user positioned at the expected position, the other screen segment is wholly outside of the given portion of the field of view of the user. For example, the whole field of view of the user may comprise a central portion surrounded by a peripheral portion. In this case, the targeted field of view may correspond to the central portion of the whole field of view of the user. The first and second screen segments are then chosen so that they can never fall concurrently at least partially within the central portion of the field of view of the user when the user is located at the expected position. For example, if the first screen segment falls at least partially within the central portion of the field of view when the user is located at the expected position, the second screen segment is wholly outside of the central portion of the field of view may be at least partially within the peripheral portion of the field of view of the user.

While the present description refers to the pairing of an image generator with two screen segments, it should be understood that an image generator may be paired with more than two screen segments.

For example, when a circular or tubular screen surrounds the user when he is positioned at an expected position relative to the screen, diametrically opposed segments of the screen can be paired together with a respective image generator so that when the user faces a given screen segment and the given screen segment falls at least partially within the targeted field of view of the user, the other screen segment that is paired with the given screen segment is located on the back of the user outside of his targeted field of view. While in this example the paired screen segments are diametrically opposed, it should be understood that the paired screen segments may have a different relative position as long as they can never fall concurrently at least partially within the targeted field of view of the user when the user is located at the expected position.

At step 14, it is determined that one of the paired screen segments, e.g., the first screen segment, falls at least partially within the targeted field of view of the user.

In one embodiment, the method comprises the steps of receiving the position of the targeted field of view and comparing the received position of the targeted field of view to the positions of the first and second screen segments to determine whether at least a portion of the first screen segment or at least a portion of the second screen segment is contained within the targeted field of view.

In one embodiment, the method 10 further comprises the step of tracking the targeted field of view of the user, i.e., determining the targeted field of view in time. It should be understood that any adequate method for determining the targeted field of view, i.e., determining the origin position, the direction or orientation and the angle of the targeted field of view, may be used.

In one embodiment, the angle of the targeted field of view, which may be characterized by a vertical angle and a horizontal angle, is predefined. In this case, the determination of the targeted field of view is obtained by determining the position of the origin and the direction of the targeted field of view. In another embodiment, the targeted field of view is dynamic, e.g., the vertical angle and/or the horizontal angle defining the targeted field of view may vary in time.

In one embodiment, the targeted field of view of the user is determined based on the position and orientation of the head of the user when it is assumed that the eyes of the user have a fixed position relative to his head, e.g., the user always looks straight in front of him even when moving his head. In this case, the method 10 comprises the steps of tracking the position and orientation of the head of the user and determining the targeted field of view of the user based on the position and orientation of the head of the user.

In another embodiment, the targeted field of view of the user is determined based on the line of sight or visual axis of the user. In this case, the method 10 comprises the steps of tracking the line of sight of the user and determining the targeted field of view of the user based on the line of sight.

It should be understood that any adequate method for tracking the line of sight of the user may be used. In one embodiment, the position and orientation of the head of the user and the position of at least one eye of the user relative to his head, e.g., the position of the pupil of at least one eye relative to the head, are tracked and the line of sight or the targeted field of view of the user is determined based on the position and orientation of the head of the user and the position of at least one eye of the user relative to his head. In another embodiment, the position of the eyes relative to the head may be considered as constant in time and known. In this case, the line of sight of the user is obtained based on the position and orientation of the head of the user. As described below, a predetermined look-up table or a decision tree may also be used to determine whether a screen segment falls at least partially within the targeted field of view of the user.

Referring back to FIG. 1, the next step 16 consists in dynamically controlling the hardware resources of the image generator paired with the first and second screen segments to prioritize the generation of a first image to be displayed on the first screen segment, i.e., the image that will be displayed at least partially within the targeted field of view, over the generation of a second image to be displayed on the second screen segment, i.e., the image that will not be seen by the user or will be seen with a low acuity, when the first screen segment falls at least partially within the targeted field of view of the user. The hardware resources may comprise any adequate hardware resources used for generating images such as computer processing units (CPUs) and graphical processing units (GPUs).

It will be understood that the terms "first" and "second" when used to characterize the images only serve the purpose of differentiating the image to be projected on the first screen segment from the image to be projected on the second screen segment, and do not imply any hierarchical or temporal relation between the images.

In one embodiment, the prioritization of the generation of the first image is related to the generation time, i.e., the time taken by the image generator to generate an image. In this case, prioritizing the generation of the first image over the generation of the second image results in assigning more time for the generation for the first image than for the generation of the second image.

In this case, the hardware resources of the image generator are controlled to provide more time for the generation of the first image than for the generation of the second image. For example, controlling the hardware resources of the image generator may correspond to assigning a first amount of time for generating the first image and a second amount of time for the generation of the second image, the second amount of time being less than the first amount of time. In one embodiment, the first and second amounts of time are predetermined. In another embodiment, the first and second amounts of time are dynamically determined and in this case, they may vary in time.

For example, the time allowed for rendering both the first and second images may be fixed in time and this time is spit for the generation of the first and second images. For example, in a 60 Hz system, the first and second images must be generated within 16.6 ms. In this case, the time allowed for generating the image to be displayed on the screen segment that falls at least partially within the targeted field of view of the user is at least equal to 8.3 ms and the time allowed for rendering the other image is at most equal to 8.3 ms.

In another embodiment, the prioritization of the generation of the first image is related to the order in which the first and second images are generated by the image generator. When the first image is prioritized, the generation of the first image occurs prior to the generation of the second image.

In this case, the hardware resources of the image generator are controlled so that the first image be generated prior to the second image. In this case, controlling the hardware resources of the image generator corresponds to assigning an order for the generation of the images.

In a further embodiment, the prioritization of the generation of the first image is related to the quality of the images. When the first image is prioritized, the quality of the first image is greater than the quality of the second image. For example, the resolution of the first image may be greater than the resolution of the second image.

In this case, the hardware resources of the image generator are controlled so that the first image be provided with a better quality than that of the second image. Controlling the hardware resources of the image generator may corresponds to assigning a respective quality or resolution to the images. In one embodiment, the resolution or quality of an image may be defined by the amount of hardware resources such as the amount of processing power, the amount of cache memory and/or the like allowed for generating the image.

In still another embodiment, the prioritization of the generation of the first image is related to the application of image enhancing. In this case, the first image is enhanced using any adequate image enhancing method while no image enhancing is performed on the second image.

In this case, the hardware resources of the image generator are controlled so that image enhancing be performed only on the first image.

In a further embodiment, the prioritization of the generation of the first image is related to the degradation of the quality for the second image while the quality for the first image remains unchanged. For example, the image generator may be configured for generating images according to a standard or predefined quality. In this case, the first image is generated according to the standard or predefined quality while the second image is degraded, i.e. the second image is generated according to a quality that is less than the standard or predefined quality to save computational resources.

In one embodiment, the prioritization of the generation of the first image is related to undersampling, i.e., undersampling is applied to the second image in order to prioritize the first image. An undersampling rate is determined for at least the second image and transmitted to the image generator. In one embodiment, undersampling is only applied to the second image and no undersampling is applied to the first image. In this case, the undersampling rate to be applied to the second image is determined and the image generator generates the second image according to the determined undersampling rate while applying no undersampling for the generation of the first image. In another embodiment, an undersampling rate is determined for both the first and second image and the undersampling rate for the first image is less than that for the second image. In this case, the respective undersampling rate is applied to the first and second images. The use of undersampling allows to save GPU resources.

In one embodiment, the prioritization of the generation of the first image is related to anti-aliasing, i.e., the anti-aliasing level of the first and/or second image is adjusted so as to prioritize the first image. An anti-aliasing level is determined for the first and/or second image and the first and second images are generated based on the determined anti-aliasing level(s). In one embodiment, the image generator is configured for generating an image according to a predefined anti-aliasing level. In this case, the anti-aliasing level associated with the first image may be increased to prioritize the generation of the first image over that of the second image. In this case, the anti-aliasing level for the first image is determined (the anti-aliasing level for the first image being greater than the predefined anti-aliasing level) and transmitted to the image generator which generates the first image according to the determined anti-aliasing level and the second image according to the predefined anti-aliasing level so as to prioritize the generation of the first image. In another embodiment, the anti-aliasing level associated with the second image is determined (the anti-aliasing level for the second image being less than the predefined anti-aliasing level) and transmitted to the image generator which generates the second image according to the determined anti-aliasing level and the first image according to the predefined anti-aliasing level so as to prioritize the generation of the first image. In another embodiment, an anti-aliasing level is determined for both the first and second images, the anti-aliasing level associated with the first image being greater than that associated with the second image. In this case, the image generator generates the first and second images according to their respective determined anti-aliasing level so as to prioritize the generation of the first image.

For example, the predefined anti-aliasing level may be 8×MSAA. In this case, the first image may be generated according to the predefined anti-aliasing level while the second image is to be generated using a lower anti-aliasing level such as 4×MSAA, 2× MSAA or no MSAA.

In one embodiment, the prioritization of the generation of the first image is related to texture size, i.e., the texture quality for the generation of the first and/or second image is adjusted so as to prioritize the first image. A texture quality is determined for the first and/or second image and the first and second images are generated based on the determined texture quality(ies). In one embodiment, the image generator is configured for generating an image according to a predefined texture quality. In this case, the texture quality associated with the first image may be increased to prioritize the generation of the first image over that of the second image. In this case, the texture quality for the first image is determined (the texture quality for the first image being greater than the predefined texture quality) and transmitted to the image generator which generates the first image according to the determined texture quality and the second image according to the predefined texture quality so as to prioritize the generation of the first image. In another embodiment, the texture quality associated with the second image is determined (the texture quality for the second image being less than the predefined texture quality) and transmitted to the image generator which generates the second image according to the determined texture quality and the first image according to the predefined texture quality so as to prioritize the generation of the first image. For example, texture LOD-bias may be used for decreasing the texture quality for the second image. In this case, a value of texture LOD-bias is determined and transmitted to the image generator which generates the second image according to the received texture LOD-bias value while applying no bias for generating the first image. In another embodiment, a texture quality is determined for both the first and second images, the texture quality associated with the first image being greater than that associated with the second image. In this case, the image generator generates the first and second images according to their respective determined texture quality so as to prioritize the generation of the first image.

In one embodiment, the prioritization of the generation of the first image is related to texture filtering, i.e., the texture filtering quality for the generation of the first and/or second image is adjusted so as to prioritize the first image. A texture filtering quality is determined for the first and/or second image and the first and second images are generated based on the determined texture filtering quality(ies). In one embodiment, the image generator is configured for generating an image according to a predefined texture filtering quality. In this case, the texture filtering quality associated with the first image may be increased to prioritize the generation of the first image over that of the second image. In this case, the texture filtering quality for the first image is determined (the texture filtering quality for the first image being greater than the predefined texture filtering quality) and transmitted to the image generator which generates the first image according to the determined texture filtering quality and the second image according to the predefined texture filtering quality so as to prioritize the generation of the first image. In another embodiment, the texture filtering quality associated with the second image is determined (the texture filtering quality for the second image being less than the predefined texture filtering quality) and transmitted to the image generator which generates the second image according to the determined texture filtering quality and the first image according to the predefined texture filtering quality so as to prioritize the generation of the first image. In another embodiment, a texture filtering quality is determined for both the first and second images, the texture filtering quality associated with the first image being greater than that associated with the second image. In this case, the image generator generates the first and second images according to their respective determined texture filtering quality so as to prioritize the generation of the first image. In one embodiment, the image generator may apply different filtering techniques in order to generate an image according to a given texture filtering quality. For example, when a low texture filtering quality is desired, the image generator may apply no anisotropic filtering or apply a nearest point sampling method. When a high texture filtering quality is desired, the image generator may apply an ×16 anisotropic filtering method and or any adequate high-quality filtering method such as a gaussian filtering method, an elliptical filtering method, or the like.

In an embodiment in which meshes are used for objects present in the generated images, the prioritization of the generation of the first image is related to the mesh detail, i.e., the mesh detail for the objects to be represented in the first and/or second image is adjusted so as to prioritize the first image. A mesh detail value is determined for the first and/or second image and the first and second images are generated based on the determined mesh detail value(s). In one embodiment, the image generator is configured for generating an image according to a predefined mesh detail value. In this case, the mesh detail value associated with the first image may be increased to prioritize the generation of the first image over that of the second image. In this case, the mesh detail value for the first image is determined (the mesh detail value for the first image being greater than the predefined mesh detail value) and transmitted to the image generator which generates the first image according to the determined mesh detail value and the second image according to the predefined mesh detail value so as to prioritize the generation of the first image. In another embodiment, the mesh detail value associated with the second image is determined (the mesh detail value for the second image being less than the predefined mesh detail value) and transmitted to the image generator which generates the second image according to the determined mesh detail value and the first image according to the predefined mesh detail value so as to prioritize the generation of the first image. In another embodiment, a mesh detail value is determined for both the first and second images, the mesh detail value associated with the first image being greater than that associated with the second image. In this case, the image generator generates the first and second images according to their respective determined mesh detail value so as to prioritize the generation of the first image. In an embodiment in which the mesh detail is downgraded for the second image, LODs may be used for downgrading the mesh detail. For example, when an image is to be generated with a low mesh detail value, a coarse 3D mesh with very few triangles can be used for the objects present in the image. In another example, when an image is to be generated with a high mesh detail value, a fine 3D mesh with millions of triangles can be used for the objects present in the image.

In one embodiment, the prioritization of the generation of the first image is related to the scene density, i.e., the content density within an image (such as trees, building, weather, etc.) for the first and/or second image is adjusted so as to prioritize the first image. A content density value is determined for the first and/or second image and the first and second images are generated based on the determined content density value(s). In one embodiment, the image generator is configured for generating an image according to a predefined content density value. In this case, the content density value associated with the first image may be increased to prioritize the generation of the first image over that of the second image. In this case, the content density value for the first image is determined (the content density value for the first image being greater than the predefined content density value) and transmitted to the image generator which generates the first image according to the determined content density value and the second image according to the predefined content density value so as to prioritize the generation of the first image. In another embodiment, the content density value associated with the second image is determined (the content density value for the second image being less than the predefined content density value) and transmitted to the image generator, which generates the second image according to the determined content density value and the first image according to the predefined content density value so as to prioritize the generation of the first image. In another embodiment, a content density value is determined for both the first and second images, the content density value associated with the first image being greater than that associated with the second image. In this case, the image generator generates the first and second images according to their respective determined content density value so as to prioritize the generation of the first image.

In one embodiment, a decrease of the scene density value associated with one of the two images leads to a decrease in the amount of data transferred to the image generator and the amount of processing time used by the image generator to generate the image in question, thereby freeing up hardware resources, notably network, CPU, and/or GPU resources to prioritize the generation of the other image. In another embodiment, an increase of the scene density value associated with one of the two images leads to an increase in the amount of data transferred to the image generator and the amount of processing time used by the image generator to generate the image in question, thereby increasing the hardware resources, notably the network, CPU, and/or GPU resources allocated to the generation of the image in question.

In one embodiment, the prioritization of the generation of the first image is related to the rendering resolution, i.e., the rendering resolution for the first and/or second image is adjusted so as to prioritize the first image. A rendering resolution value is determined for the first and/or second image and the first and second images are generated based on the determined rendering resolution value(s). In one embodiment, the image generator is configured for generating an image according to a predefined rendering resolution value. In this case, the rendering resolution value associated with the first image may be increased to prioritize the generation of the first image over that of the second image. In this case, the rendering resolution value for the first image is determined (the rendering resolution value for the first image being greater than the predefined rendering resolution value) and transmitted to the image generator which generates the first image according to the determined rendering resolution value and the second image according to the predefined rendering resolution value so as to prioritize the generation of the first image. In another embodiment, the rendering resolution value associated with the second image is determined (the rendering resolution value for the second image being less than the predefined rendering resolution value) and transmitted to the image generator which generates the second image according to the determined rendering resolution value and the first image according to the predefined rendering resolution value so as to prioritize the generation of the first image. In another embodiment, a rendering resolution value is determined for both the first and second images, the rendering resolution value associated with the first image being greater than that associated with the second image. In this case, the image generator generates the first and second images according to their respective determined rendering resolution value so as to prioritize the generation of the first image. For example, when an image is to be generated with a low rendering resolution, a simple 1×1 pixel grid can be used. In another example, when an image is to be generated with a high rendering resolution, the image may be generated with a 4 k resolution, an 8 k resolution, a WQXGA resolution, or the like.

In one embodiment, the above-described values determined for the generation of the images, such as the quality values, the undersampling rates, the anti-aliasing levels, the texture quality values, the texture quality values, the texture filtering quality values, the mesh detail values, the content density values and the rendering resolution values, can be normalized so as to be comprised between 0 and 1.

Referring back to FIG. 1, the next step 18 consists in generating the first and second images according to the prioritization of the first image determined at step 18. In one embodiment, the first and second images are generated based on the location of their respective screen segments.

In an embodiment in which the prioritization is related to the generation time, the image generator spends more time for generating the first image than for generating the second image.

In an embodiment in which the prioritization is related to the order in which the first and second images are generated, the first image is generated by the image generator prior to the second image.

In an embodiment in which the prioritization is related to the quality of the images, the first image is provided with a better quality than the second image. For example, the image generator may allocate more computing resource for generating the first image than for generating the second image. The quality of an image may refer to the resolution of the image so that the resolution of the first image is greater than the resolution of the second image. In another example, the first image may be generated normally while the second image may be an image of only one color such as a white image or a black image. When the second image is a white image, a given intensity may be assigned to the white image and the given intensity is chosen so as to maintain a given luminosity around the user. In a further example, the first image may be generated normally while the second image may be a blurred image.

In an embodiment in which the prioritization is related to the application of image enhancing, image enhancing is applied only to the first image after the generation of the first and second images.

In an embodiment in which at least one value such as a quality value, an undersampling rate, an anti-aliasing level, a texture quality value, a texture filtering quality value, a mesh detail value, a content density value and a rendering resolution value, is received the first and/or second image is generated by the image generator based on the received value(s).

Then, at step 20, the first and second images are displayed on the first and second screen segments, respectively.

In an embodiment in which projectors are used for displaying the images to the user, the first and second images are transmitted to their respective projector to be projected on their respective screen segment.

In an embodiment in which the second image is a black image, no image is displayed on the second screen segment.

As described above, the targeted field of view of the user may comprises the whole field of view of the user or only a portion of the whole field of view.

In an embodiment in which the targeted field of view comprises the whole field of view of the user so that the first and second screen segments can never concurrently fall within the whole field of view, the horizontal angle of the targeted field of view is comprised between about 200 degrees and 220 degrees so that the targeted field of view of the user comprises the binocular field of view and the temporal crescent fields of view. The vertical angle of the targeted field of view may be comprised between about 130 degrees and about 135 degrees.

Figure 2A:
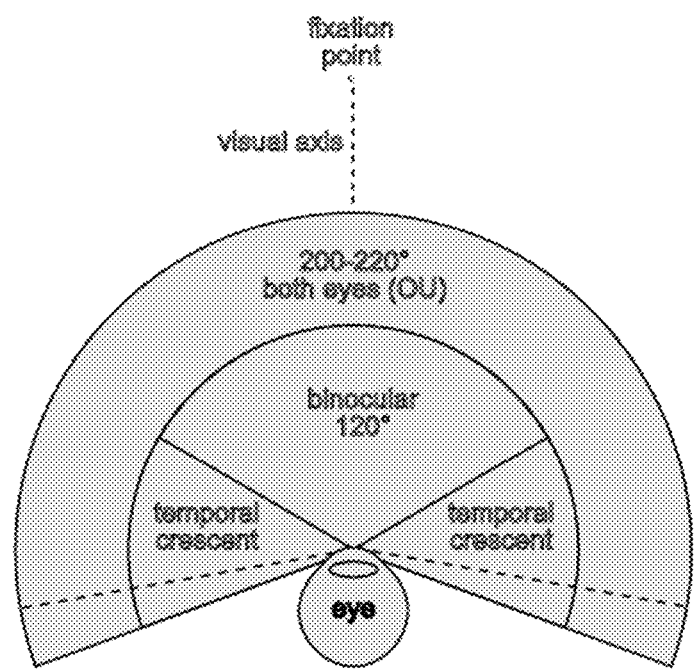
FIG. 2A schematically illustrates the horizontal component of a human field of view, in accordance with the prior art.
Figure 2B:
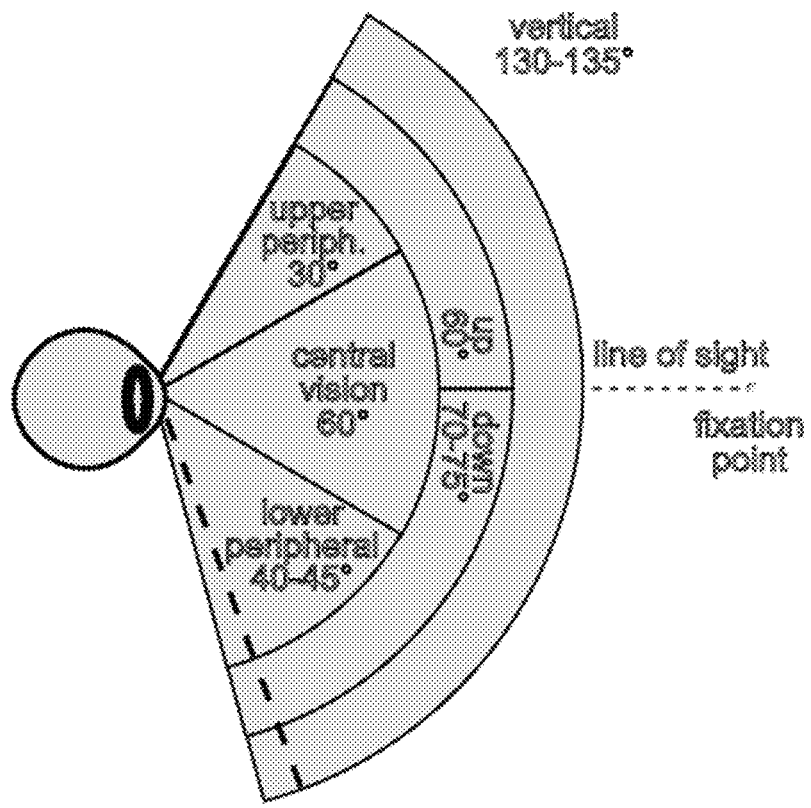
FIG. 2B schematically illustrates the horizontal component of a human field of view, in accordance with the prior art.

In an embodiment in which the targeted field of view comprises only a given portion of the whole field of view of the user so that the first and second screen segments can never concurrently fall within the given portion of the whole field of view and referring to FIGS. 2A and 2B, the horizontal angle of the targeted field of view may be equal to about 120 degrees so that the targeted field of view corresponds to only the binocular field of view. It should be understood that the horizontal angle may vary and may have any adequate value comprised between 0 degree and 220 degrees for example. Similarly, the value of the vertical angle of the targeted field of view may vary. For example, the vertical angle of the targeted field of view may be equal to about 60 degrees centered on the line of sight of the user so that the targeted field of view corresponds to the central vision field of view. In another example, the vertical angle of the targeted field of view may be equal to about 90 degrees so that the targeted field of view comprises the upper peripheral field of view and the central vision field of view. In a further example, the vertical angle of the targeted field of view may be comprised between about 100 degrees and 105 degrees so that the targeted field of view comprises the lower peripheral field of view and the central vision field of view. It should be understood that any combination of horizontal and vertical angle values may be used for the targeted field of view. For example, of the targeted field of view may have a horizontal angle of about 120 degrees and a vertical angle comprised between about 130 degrees and about 135 degrees. In another example, of the targeted field of view may have a horizontal angle of about 120 degrees and a vertical angle of about 60 degrees.

Figure 3:
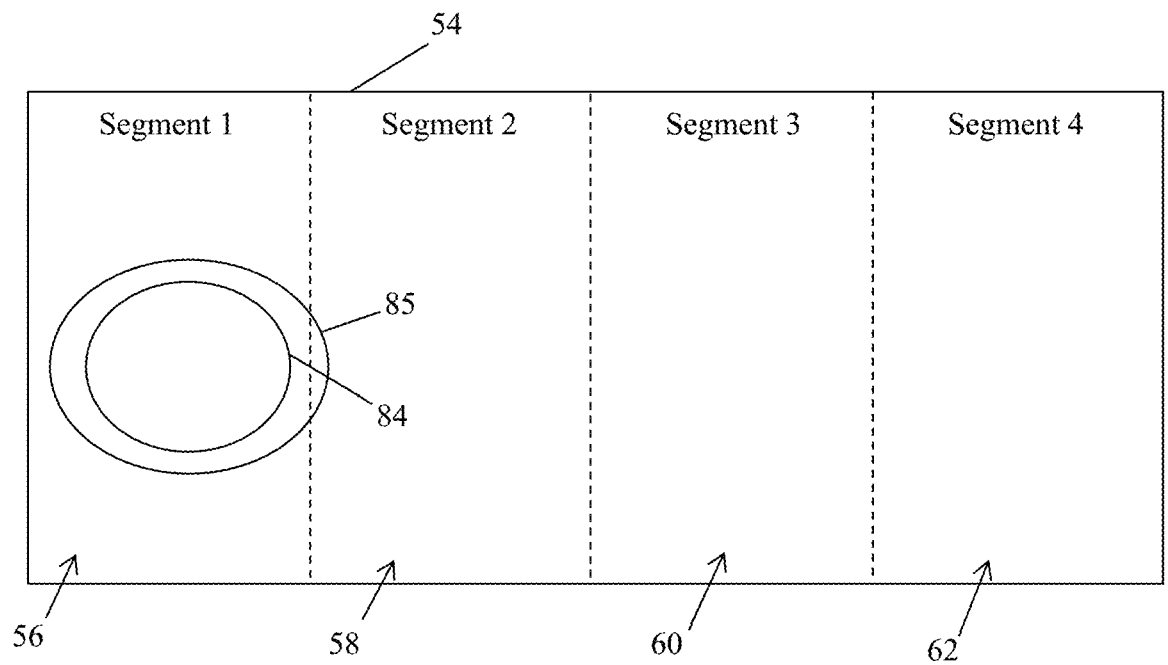
FIG. 3 is a block diagram illustrating a system for displaying images on different segments of a screen when the field of view of a user has a first position relative to the screen, in accordance with an embodiment.
Figure 3:
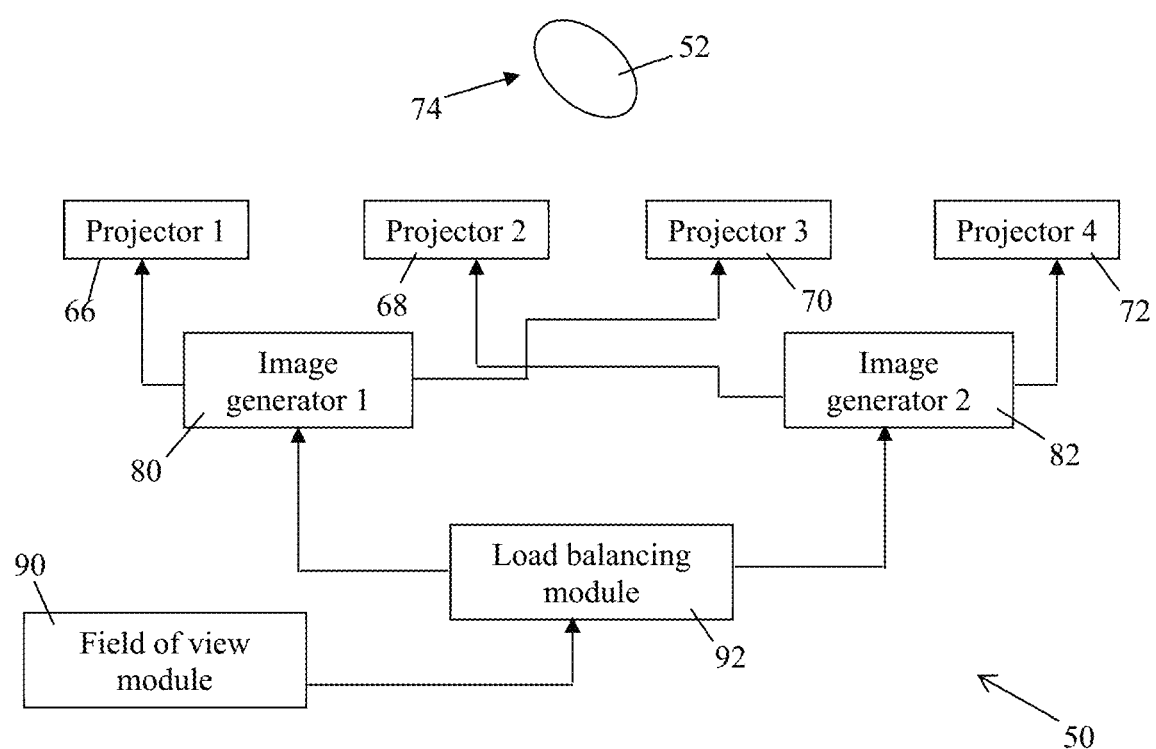

FIG. 3 schematically illustrates a system 50 for displaying images to a user 52 on a screen 54. The screen 54 comprises four screen segments 56, 58, 60 and 62 on which a respective image is be projected by a respective projector 66, 68, 70, 72. The screen 54 has a planar rectangular shape and each screen segment 56, 58, 60, 62 also has a rectangular shape. The screen segments 56, 58, 60 and 62 are horizontally located side-by-side with the screen segment 56 being the far-left screen, the screen segment 62 being the far right screen, and the screen segments 58 and 60 being adjacent to the screen segments 56 and 62, respectively. While in the illustrated embodiment, the screen 54 is provided with a planar rectangular shape, it should be understood that the screen 54 may have any other adequate shape. For example, the screen 54 may be curves, circular, etc.

The system 50 further comprises a first image generator image 80 and a second image generator 82 for generating the images to be projected on the screen segments 56 and 60 and the screen segments 58 and 62, respectively.

The screen segments 56, 58, 60 and 62, and therefore their respective projectors 66, 68, 70 and 72, are paired two by two with a respective image generator 80, 82, i.e., the screen segments 56 and 60 are paired with the first image generator 80 and the screen segments 58 and 62 are paired with the second image generator 82. When the user 52 is positioned at an expected position 74 relative to the screen 54 and one of the screen segments 56 and 60 falls at least partially within a targeted field of view which corresponds to a central portion 84 of the whole field of view 85 of the user 52, the other screen segment 56, 60 is wholly outside of the central portion 84 of the whole field of view 85 of the user 52. Similarly, when the user 52 is positioned at the expected position 74 and one of the screen segments 58 and 62 falls at least partially within the central portion 84 of the whole field of view 85 of the user 52, the other screen segment 58, 62 is wholly outside of the central portion 84 of the whole field of view 85 of the user 52.

In one embodiment, the expected position 74 relative to the screen 54 is predefined. In this case, the characteristics of the four screen segments 56, 58, 60 and 62, such as their position within the screen 54, their size and their shape, are determined so that when one of the screen segments 56 and 60 falls at least partially within the central portion 84 of the field of view 85 of the user 52, the other screen segment 56, 60 is wholly outside of the central portion 84 of the field of view 85, and so that when one of the screen segments 58 and 62 falls at least partially within the central portion 84 of the field of view 85 of the user 52, the other screen segment 58, 62 is wholly outside of the central portion 84 of the field of view 85.

In another embodiment, the characteristics of the screen segments 56, 58, 60 and 62 are predefined and the expected position 74 of the user 52 is chosen so that when one of the screen segments 56 and 60 falls at least partially within the central portion 84 of the field of view 85 of the user 52, the other screen segment 56, 60 is wholly outside of the central portion 84 of the field of view 85, and so that when one of the screen segments 58 and 62 falls at least partially within the central portion 84 of the field of view 85 of the user 52, the other screen segment 58, 62 is wholly outside of the central portion 84 of the field of view 85.

The system 50 further comprises a field of view module 90 and a load balancing module 92. The field of view module 90 is configured for determining which screen segment 56, 58, 60, 62 falls at least partially within the central portion 84 of the field of view 85 of the user 52, and the load balancing module 92 is configured for dynamically controlling the hardware resources of the first image generator 80 and the hardware resources of the second image generator 82.

In one embodiment, the field of view module 90 receives the position of the field of view 84 of the user 52 and determines whether one or more screen segment 56, 58, 60, 62 falls within the central portion 84 of the field of view 85.

In one embodiment, the field of view module 90 is configured to compare the position of the central portion 84 of the field of view 85 to the position of the screen segments 56, 58, 60 and 62 to identify the given screen segments(s) 56, 58, 60, 62 that fall(s) at least partially within the central portion 84 of the field of view 85.

In one embodiment, the field of view module 90 is configured to receive the line of sight of the user 52 and calculate the central portion 84 of the field of view 85 based on the received line of sight. In this case, the shape of central portion 84 of the field of view 85 may be predefined and the orientation of the central portion 84 of the field of view 85 and the position of the origin of the central portion 84 of the field of view 85 are given by the line of sight. In one embodiment, the system 50 further comprises a tracking device (not shown) for tracking the line of sight of the user 52.

In another embodiment, the field of view module 90 is configured to identify the screen segment(s) which fall(s) at least partially within the central portion 84 of the field of view 85 based on the line of sight of the user 52 without calculating the field of view 84. For example, the field of view module 90 may comprise a predetermined look-up table or a decision tree which assigns identifications of screen segments that fall at least partially within the central portion 84 of the field of view 85 of the user 52 to respective lines of sight. Using the predetermined look-up table or the decision tree, the identification of the screen segment(s) that fall(s) at least partially within the central portion 84 of the field of view 85 can be determined knowing only the line of sight of the user 52. The use of a predetermined look-up table or a decision tree allows for making a quick assessment of the field of view, thereby reducing the computational burden on the field of view module 90.

In one embodiment, the field of view module 90 is configured to receive the position and orientation of the head of the user 52 and the position of at least one eye relative to the head, and calculate the central portion 84 of the field of view 85 based on the position and orientation of the head and the position of the eye(s) relative to the head. In one embodiment, the system 50 further comprises at least one tracking device (not shown) for tracking the position and orientation of the head of the user 52 and the position of the eye(s) relative to the head.

In one embodiment, the field of view module 90 is configured to first calculate the line of sight of the user 52 based on the received position and orientation of the head and position of the eye(s) relative to the head, and then calculate the central portion 84 of the field of view 85 based on the calculated line of sight. In another embodiment, the field of view module 90 is configured to calculate the central portion 84 of the field of view 85 directly based on the received position and orientation of the head and position of the eye(s) relative to the head.

In another embodiment, the field of view module 90 is configured to identify the screen segment(s) which fall(s) at least partially within the central portion 84 of the field of view 85 based on the line of sight of the user 52 without calculating the field of view 84. For example, the field of view module 90 may comprise a predetermined look-up table or a decision tree which assigns identifications of screen segments that fall at least partially within the central portion 84 of the field of view 85 of the user 52 to respective combinations of positions and orientations of the head and positions of the eye(s) relative to the head. Using the predetermined look-up table or the decision tree, the identification of the screen segment(s) that fall(s) at least partially within the central portion 84 of the field of view 85 can be determined knowing only the position and orientation of the head and the position of the eye(s) relative to the head. The use of a predetermined look-up table or a decision tree allows for making a quick assessment of the field of view, thereby reducing the computational burden on the field of view module 90.

As described above, the position of the eyes relative to the head of the user 52 may be considered as being fixed and constant in time. In this case, the field of view module 90 is configured to determine the line sight and/or the central portion 84 of the field of view 85 of the user 52 based only on the position and orientation of the head of the user 52.

Referring back to FIG. 3, the load balancing module 92 is configured for receiving the identification of the screen segment(s) 56, 58, 60, 62 which fall(s)s at least partially within the central portion 84 of the field of view 85 of the user 52 from the field of view module 90 and dynamically control the hardware resources of the first and second image generators 80 and 82 to prioritize the generation of the images to be projected on the screen segment(s) 56, 58, 60, 62 which fall(s)s at least partially within the central portion 84 of the field of view 85 over the generation of the images to be projected on the screen segment(s) 56, 58, 60, 62 which fall(s)s wholly outside of the central portion 84 of the field of view 85.

In the illustrated embodiment, only the first screen segments 56 is covered by the central portion 84 of the field of view 85 of the user while the other three screen segments 58, 60 and 62 falls wholly outside of the central portion 84 of the field of view 85. In this case, the field of view module 90 then transmits an identification of the first screen segments 56 to the load balancing module 92. Since the first screen segment 56 is associated with the first image generator 80, the load balancing module 92 controls the hardware resources to prioritize the generation of the image to be projected on the first screen segments 56 over the generation of the image to be projected on the third screen segment 60. Since none of the second and fourth screen segments 58 and 62 falls at least partially within the central portion 84 of the field of view 85, the load balancing module 92 may determine that none of the images to be projected on the screen segments 58 and 62 should be prioritized. The second image generator 82 then generates the images to be projected on the second and fourth screen segments 58 and 62 without any intervention from the load balancing module 92.

In an embodiment in which the prioritization is related to the generation time, the load balancing module 92 controls the hardware resources of the first image generator 80 so that the first image generator 80 spends more time for generating prioritized image, i.e., the image to be projected on the first screen segment 56, than for generating the unprioritized image, i.e., the image to be projected on the third screen segment 60.

In an embodiment in which the prioritization is related to the order in which the images are to be generated, the load balancing module 92 controls the hardware resources of the first image generator 80 so that the first image generator 80 generates the prioritized image prior to generating the unprioritized image.

In an embodiment in which the prioritization is related to the quality of the images, the load balancing module 92 controls the hardware resources of the first image generator 80 so that the first image generator 80 generates the prioritized image with a quality being greater than that of the unprioritized image. For example, the prioritized image may be provided with a predefined normal or usual quality while the unprioritized image is provided with a lower quality. For example, the prioritized image may be provided with a predefined normal or usual resolution while the unprioritized image is provided with a lower resolution. In another example, the unprioritized image may be blurred due to the lower resolution. In a further example, the unprioritized image may be an image of only one color such as a white image or a black image.

In an embodiment in which the prioritization is related to the application of image enhancing, the load balancing module 92 controls the hardware resources of the first image generator 80 so that the first image generator 80 applies image enhancing only to the prioritized image and no image enhancing is applied to the unprioritized image.

In an embodiment in which the prioritization is related to undersampling, anti-aliasing, texture size, texture filtering, mesh detail, scene density, or rendering resolution, the load balancing module 92 determines at least one value such as a quality value, a undersampling rate, a anti-aliasing level, a texture quality value, a texture quality value, a texture filtering quality value, a mesh detail value, a content density value and a rendering resolution value, for the first and/or second image. The determined value(s) is(are) sent to the image generator 80 which generates the images based on the received value(s).

Once the images have been generated by the image generators 80 and 82, each image is transmitted to its respective projector 66, 68, 70, 72 and each projector 66, 68, 70, 72 projects its respective received image on its respective screen segment 56, 58, 60, 62.

In an embodiment in which an unprioritized image is a black image, the corresponding projector 66, 68, 70, 72 projects no image on the screen segment 56, 58, 60, 62 associated with the unprioritized image.

Figure 4:
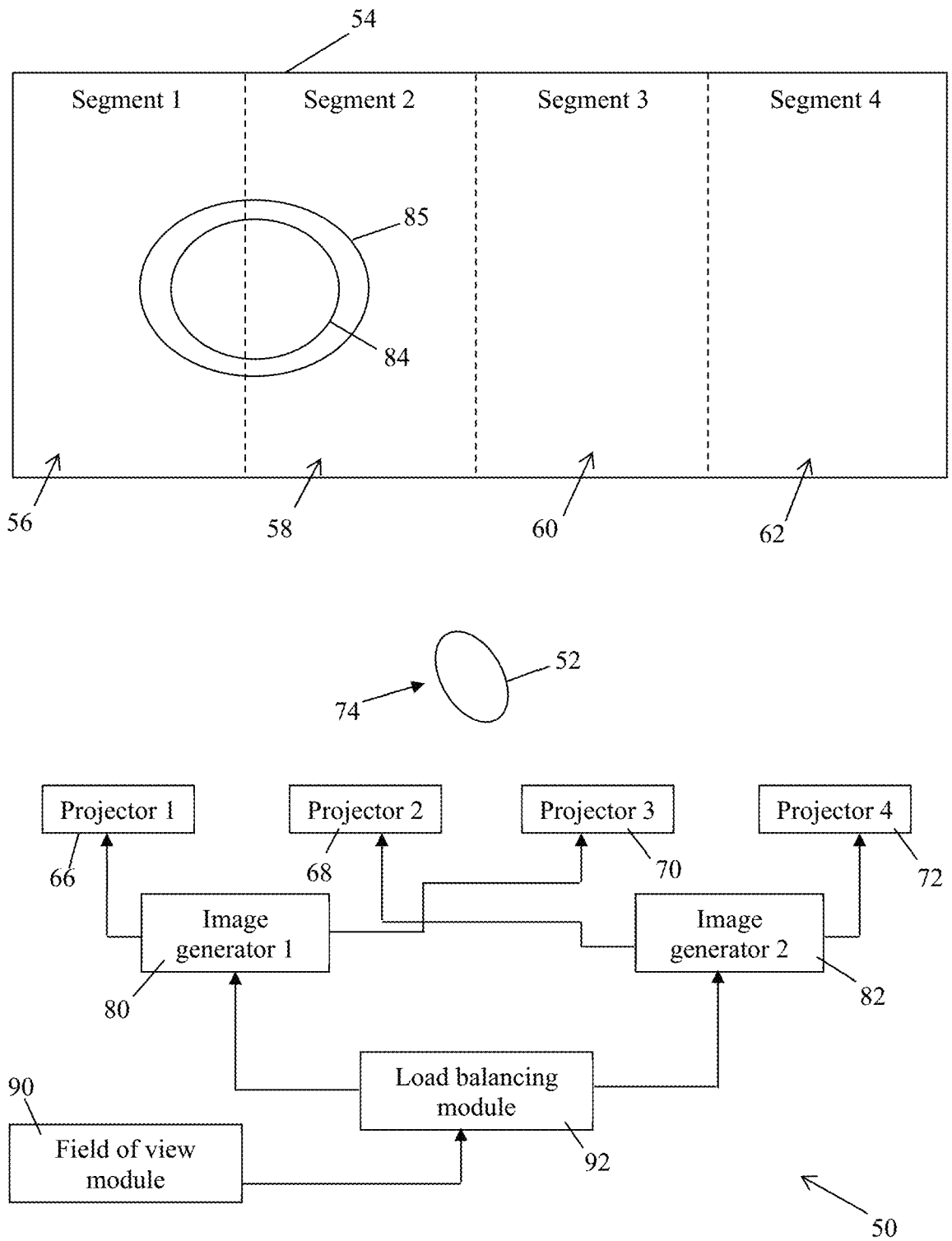
FIG. 4 is a block diagram illustrating the system of FIG. 3 when the field of view of the user has a second position relative to the screen.

FIG. 4 illustrates the system 50 when the user 52 slightly turned his head towards the right end of the screen 54. In this case, the central portion 84 of the field of view 85 of the user 52 now overlaps the first and second screen segments 56 and 58.

The field of view module 90 determines that the first and second screen segments 56 and 58 each fall at least partially within the central portion 84 of the field of view 85 of the user 52. As a result of the determination performed by the field of view module 90, the load balancing module 92 controls the hardware components of the first image generator 80 to prioritize the generation of the image to be projected on the first screen segment 56 and further controls the hardware components of the second image generator 82 to prioritize the generation of the image to be projected on the second screen segment 58.

Figure 5:
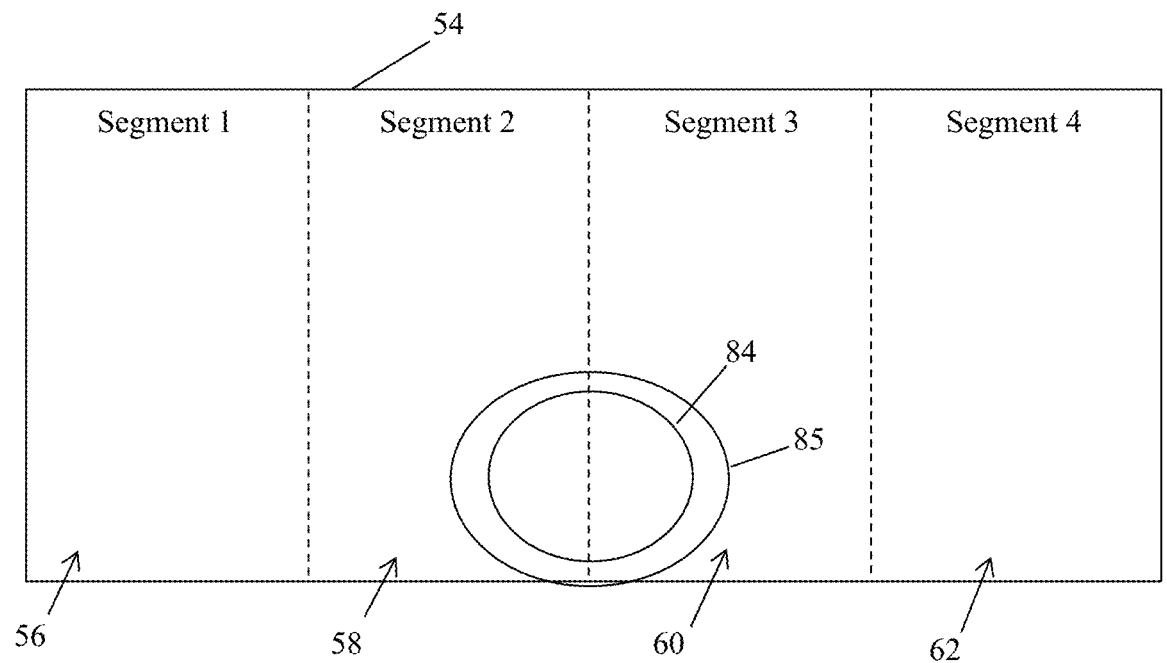
FIG. 5 is a block diagram illustrating the system of FIG. 3 when the field of view of the user has a third position relative to the screen.
Figure 5:
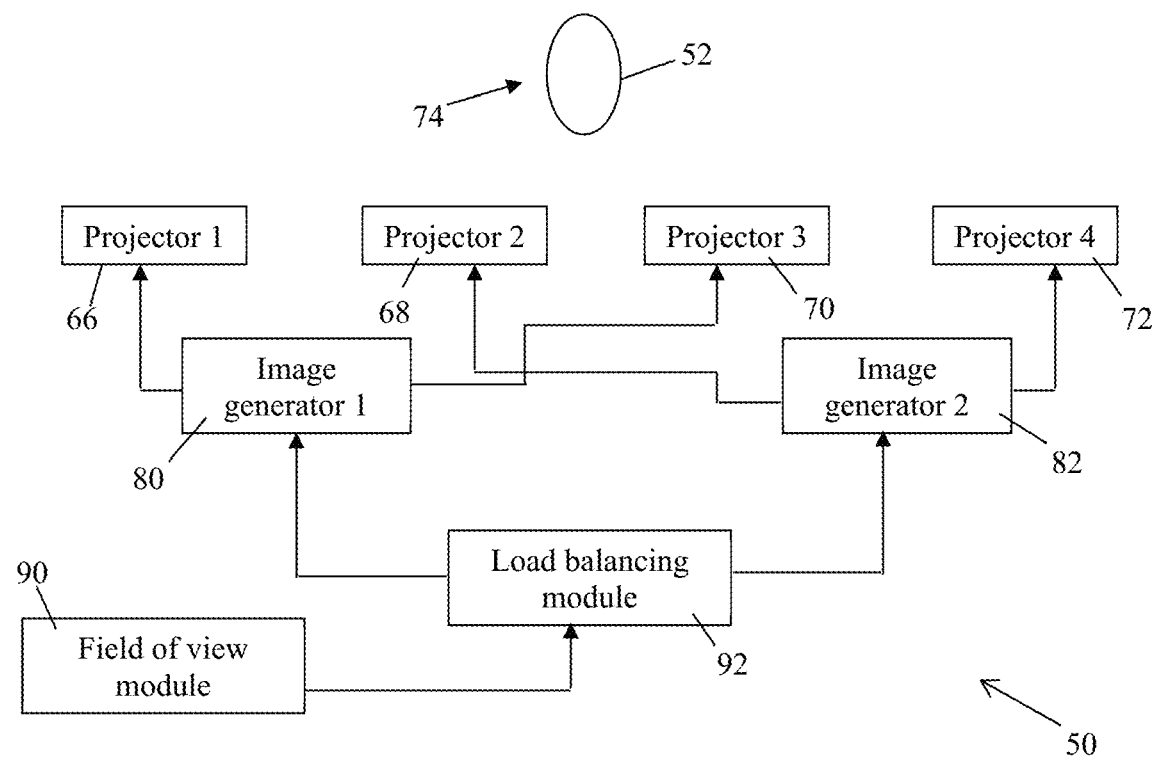

FIG. 5 illustrates the system 50 when the user has further turned his head towards the right end of the screen 54. In this case, the central portion 84 of the field of view 85 of the user 52 now overlaps the second and third screen segments 58 and 60.

The field of view module 90 determines that the second and third screen segments 58 and 60 each fall at least partially within the central portion 84 of the field of view 85 of the user 52. As a result of the determination performed by the field of view module 90, the load balancing module 92 controls the hardware components of the first image generator 80 to prioritize the generation of the image to be projected on the third screen segment 60 and further controls the hardware components of the second image generator 82 to prioritize the generation of the image to be projected on the second screen segment 58.

It should be understood that the control performed by the load balancing module 92 over the hardware resources of the image generators 80 and 82 is dynamic, i.e., the control changes in time while the position of the central portion 84 of the field of view 85 changes in time.

While in the illustrated embodiment, a single load balancing module is used for controlling the hardware resources of the two image generators 80 and 82, it should be understood that the system may comprise two distinct load blacking modules each for controlling the hardware resources of a respective image generator 80, 82. In this case, the two load balancing modules can each be integrated into their respective image generator.

In one embodiment, the load balancing module 92 comprises at least one processor, a memory and a communication interface for communicating with an image generator 80, 82.

In one embodiment, the generation and display of the images is performed in real-time so that any change in the field of view of the user 52 is reflected in real-time in the displayed images. For example, a tracking device may continuously track the central portion 84 of the field of view 85 of the user 52 so that the field of view module 90 continuously identifies the given screen segment(s) that fall(s) at least partially within the central portion 84 of the field of view 85 of the user 52 and the load balancing module 92 continuously controls the hardware resources of the image generators 80 and 82 so as to continuously prioritize the generation of the image(s) to be projected on the screen segment(s) identified by the field of view module 90.

It will be appreciated that since an image displayed on a screen segment that does not at least partially fall within the field of view of the user is not seen by the user, downgrading the priority level of this image has no consequences on the perception of the user. Therefore, if the quality of the image is decreased or the image is displayed slightly after the display of the images that are at least partially within the field of view of the user, the user experience is not affected since the image is not seen by the user.

Figure 6:
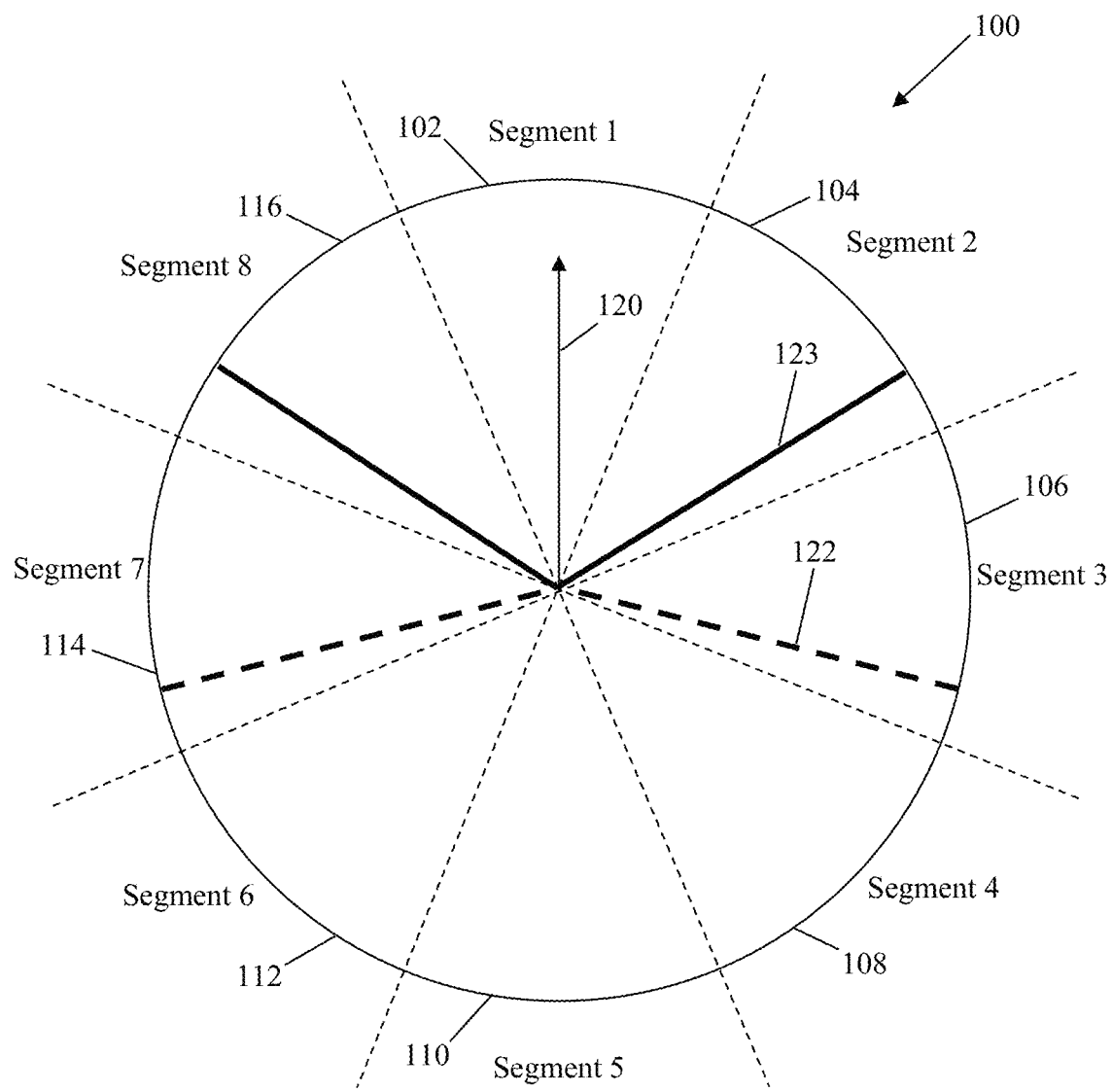
FIG. 6 schematically illustrates a circular screen and the position of the field of view of a user relative to the screen, in accordance with an embodiment.

In one embodiment, the present method 10 is used in the context of a simulator such as in the context of a vehicle simulator, an aircraft simulator, etc. FIG. 6 illustrates a top view of a circular screen 100 used in a such a simulator for displaying images to a user. For example, the screen 100 may be used for displaying images a scene representing what would be seen if the user of the simulator would be in a real vehicle for example, images of controls and instruments, etc.

The screen 100 is divided into eight segments 102, 104, 106, 108, 110, 112, 114 and 116 and each screen segment 102, 104, 106, 108, 110, 112, 114, 116 has a hemi-circular shape. Each screen segment 102, 104, 106, 108, 110, 112, 114, 116 is associated with a respective projector (not shown) for projecting a respective image thereon.

The simulator also comprises four image generators (not shown) such as image generators 80 and 82, a field of view module such as field of view module 90 and at least one load balancing module such as load balancing module 92.

In the illustrated embodiment, the user of the simulator is located at an expected position, i.e., the center of the circular screen 100, and looks at the screen according to the line of sight 120. The field of view 122 is associated with the user. The field of view 122 corresponds to the whole field of view of the user and comprises a given central portion 123 which is centered on the line of sight 120 of the user.

The screen segments 102, 104, 106, 108, 110, 112, 114 and 116 are paired two by two with a respective image generator so that when the user is located at the expected position, the two paired screen segments can never be both concurrently at least partially within the central portion 123 of the field of view 122 of the user. For example, the first and fifth screen segments 102 and 110 can be paired with a first image generator, the second and sixth screen segments 104 and 112 can be paired with a second image generator, the third and seventh screen segments 106 and 114 can be paired with a third image generator, and the fourth and eighth screen segments 108 and 116 can be paired with a fourth image generator.

In operation, the field of view module continuously determines which screen segments 102, 104, 106, 108, 110, 112, 114, 116 fall at least partially within the central portion 123 of the field of view 122 of the user. As a result of the determination performed by the field of view module, the load balancing module dynamically controls the hardware components of the image generators to prioritize the generation of the images to be projected on the screen segments 102, 104, 106, 108, 110, 112, 114, 116 identified by the field of view module.

In the illustrated embodiment, the field of view module determines that the screen segments 102, 104 and 116 fall at least partially within the central portion 123 of the field of view 122 of the user while the other screen segments 106, 108, 11, 112 and 114 fall entirely outside of the central portion 123 of the field of view 122. As a result, the load balancing module controls the hardware components of the image generators associated with the screen segments 102, 104 and 116, i.e., the first, second and fourth image generators, to prioritize the generation of the image to be projected on the first screen segment 102 over the generation of the image to be projected on the fifth screen segment 110, the generation of the image to be projected on the second screen segment 104 over the generation of the image to be projected on the sixth screen segment 112, and the generation of the image to be projected on the eighth screen segment 116 over the generation of the image to be projected on the fourth screen segment 108.

In one embodiment, no image or a white image may be generated for the screen segments 108, 110 and 112 which are outside of the field of view 122 of the user since the user will not see the images displayed thereon while a lower quality image may be generated and displayed on the screen segments 106 and 114 which fall outside of the central portion 123 of the field of view 122 while still falling at least partially within the field of view 122.

In one embodiment, the above-described method 10 is embodied as a non-transitory computer program product for displaying images on a screen to a user, the non-transitory computer program product comprising a computer readable memory storing computer-executable instructions thereon that when executed by a computer perform at least some of the steps of the method 10.

While the above description the method and system for displaying images are described in the context of a simulator, it should be understood that the method and system are not limited to simulators and may be used in other context such as for video games, visual art, etc.

The embodiments of the invention described above are intended to be exemplary only. The scope of the invention is therefore intended to be limited solely by the scope of the appended claims.

We claim:

1. A display system defining an expected position for a user with respect to a screen, the screen having a first segment and a second segment positioned with respect to one another so as to never simultaneously fall at least partially within a targeted field of view of the user when the user is positioned at the expected position, the display system comprising:

an image generator paired with a first projector covering the first segment and a second projector covering the second segment, the image generator being configured to generate a first image to be projected by the first projector on the first segment and a second image to be projected by the second projector on the second segment;

a field of view module for determining that the first segment falls at least partially within the targeted field of view of the user; and a load balancing module for dynamically controlling hardware resources of the image generator to prioritize the generation of the first image over the generation of the second image when the first segment falls at least partially within the targeted field of view of the user.

2. The display system of claim 1, further comprising a tracking unit for determining at least one of a position of a head of the user, an orientation of the head of the user, a position of at least one eye of the user and a line of sight of the user.

3. The display system of claim 2, wherein the field of view module is configured to determine that the first segment falls at least partially within the targeted field of view of the user based on the at least one of the position of the head of the user, the orientation of the head of the user, the position of the at least one eye of the user and the line of sight of the user.

4. The display system of claim 1, wherein the load balancing module is configured for determining a first resolution for the first image and a second resolution for the second image and the image generator is configured to generate the first image provided with the first resolution and the second image with the second resolution, the first resolution being greater than the second resolution as a result of the prioritization of the first image by the load balancing module.

5. The display system of claim 1, wherein the image generator is configured to generate the second image as one of:
a black image so that the second projector projects no image as a result of the prioritization of the first image by the load balancing module;
a white image as a result of the prioritization of the first image by the load balancing module; and
a blurred image.

6. The display system of claim 5, wherein, when the second image is the white image, the image generator is configured to determine a given intensity for the white image to maintain a given luminosity around the user.

7. The display system of claim 1, wherein the load balancing module is configured for determining a first value of a parameter for the first image and a second value of the parameter for the second image and the image generator is configured for generating the first image according to the first value of the parameter and the second image according to the second value of the parameter, the parameter comprising one of: an image quality, an undersampling, an anti-aliasing, a texture quality, a texture filtering quality, a mesh detail, a content density and a rendering resolution.

8. The display system of claim 1, further comprising the first projector and the second projector.

9. A method for controlling an image generator to display images on a screen to a user when the user is positioned at an expected position with respect to the screen, the screen having a first segment and a second segment positioned with respect to one another so as to never simultaneously fall at least partially within a targeted field of view of the user when the user is positioned at the expected position, the image generator being paired with a first projector covering the first segment and a second projector covering the second segment, the image generator being configured to generate a first image to be projected by the first projector on the first segment and a second image to be projected by the second projector on the second segment, the method comprising:
when the first segment falls at least partially within the targeted field of view of the user, dynamically controlling hardware resources of the image generator to prioritize the generation of the first image over the generation of the second image when the first segment falls at least partially within the targeted field of view of the user.

10. The method of claim 9, further pairing the image generator with the first segment and the second segment.

11. The method of claim 9, further comprising determining that the first segment falls at least partially within the targeted field of view of the user.

12. The method of claim 10, further comprising determining at least one of a position of a head of the user, an orientation of the head of the user, a position of at least one eye of the user and a line of sight of the user, said determining that the first segment falls at least partially within the targeted field of view of the user being performed based on the at least one of the position of the head of the user, the orientation of the head of the user, the position of the at least one eye of the user and the line of sight of the user.

13. The method of claim 9, wherein the first image is provided with a first resolution and the second image with a second resolution, the first resolution being greater than the second resolution as a result of the prioritization of the first image.

14. The method of claim 9, wherein the second image is one of:
a black image so that no image is projected on the second segment as a result of the prioritization of the first image;
a white image as a result of the prioritization of the first image; and
a blurred image.

15. The method of claim 14, further comprising, when the second image is the white image, determining a given intensity for the white image to maintain a given luminosity around the user.

16. The method of claim 9, wherein said dynamically controlling the hardware resources comprises determining a first value of a parameter for the first image and a second value of the parameter for the second image and the image generator is configured for generating the first image according to the first value of the parameter and the second image according to the second value of the parameter, the parameter comprising one of: an image quality, an undersampling, an anti-aliasing, a texture quality, a texture filtering quality, a mesh detail, a content density and a rendering resolution.

17. The method of claim 9, further comprising the image generator generating the first image and the second image.

18. The method of claim 9, further comprising the first projector projecting the first image on the first segment and the second projector projecting the second image on the second segment.

19. A non-transitory computer program product for controlling an image generator to display images on a screen to a user when the user is positioned at an expected position with respect to the screen, the screen having a first segment and a second segment positioned with respect to one another so as to never simultaneously fall at least partially within a targeted field of view of the user when the user is positioned at the expected position, the image generator being paired with a first projector covering the first segment and a second projector covering the second segment, the image generator being configured to generate a first image to be projected by the first projector on the first segment and a second image to be projected by the second projector on the second segment, the non-transitory computer program product comprising a computer readable memory storing computer-executable instructions thereon that when executed by a computer, cause the computer to perform the steps of:

when the first segment falls at least partially within the targeted field of view of the user, dynamically controlling hardware resources of the image generator to prioritize the generation of the first image over the generation of the second image when the first segment falls at least partially within the targeted field of view of the user.

20. A system for controlling an image generator to display images on a screen to a user when the user is positioned at an expected position with respect to the screen, the screen having a first segment and a second segment positioned with respect to one another so as to never simultaneously fall at least partially within a targeted field of view of the user when the user is positioned at the expected position, the image generator being paired with a first projector covering the first segment and a second projector covering the second segment, the image generator being configured to generate a first image to be projected by the first projector on the first segment and a second image to be projected by the second projector on the second segment, the system comprising:

a non-transitory computer program product comprising a computer readable memory storing computer-executable instructions;

at least one processor for executing the computer-executable instructions to perform the steps of:

when the first segment falls at least partially within the field of view of the user, dynamically controlling hardware resources of the image generator to prioritize the generation of the first image over the generation of the second image when the first segment falls at least partially within the targeted field of view of the user.

\* \* \* \* \*